H. A. Alden,

Protecting Ends of Rubber Hose.

No. 97,853.  Patented Dec. 14, 1869.

Henry A. Alden
by A. Pollok
his atty.

WITNESSES.

United States Patent Office.

HENRY A. ALDEN, OF MATTEAWAN, NEW YORK.

Letters Patent No. 97,853, dated December 14, 1869.

IMPROVED MODE OF PROTECTING THE ENDS OF VULCANIZED-RUBBER HOSE.

The Schedule referred to in these Letters Patent and making part of the same.

*To whom it may concern:*

Be it known that I, HENRY A. ALDEN, of Matteawan, county of Dutchess, and State of New York, have invented certain new and improved Means for Protecting the Ends of Vulcanized India-Rubber Hose; and I hereby declare the following to be a full, clear, and exact description of the same, reference being had to the accompanying drawing, in which—

Figure 1:
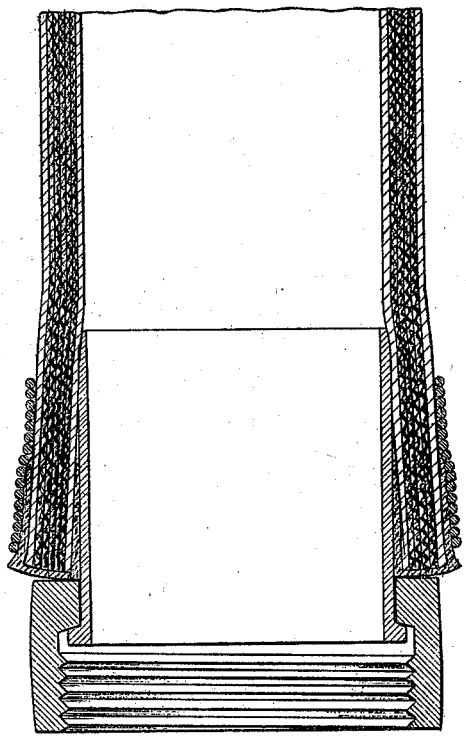
Figure 1 is a longitudinal central section through that portion of the hose to which my invention relates.
Figure 2:
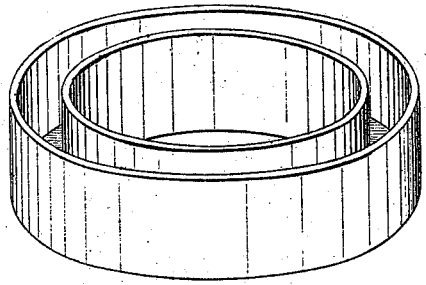
Figure 2 is a perspective view of the annular cap by which the end of the hose is covered.

My invention relates to vulcanized India-rubber hose, composed of plies of canvas or other suitable fabric, and rubber applied to the canvas and vulcanized, in the manner well known to those skilled in that branch of manufacture to which this invention pertains.

It has been found that the hose is apt to rot at the couplings, or at the point where the ends of the sections of which the hose is composed are united or coupled together. This result is attributable to the fact, that as the ends of the sections are cut so as to expose the plies of canvas which enter into their composition, water or moisture is liable to be absorbed by or taken up into the canvas by capillary action, and by reason of the injurious action of the liquid upon the canvas, the parts of the hose around the couplings are caused to rot, and become weaker and unable to resist pressure, in process of time.

To remedy this evil, I provide for the exposed end of the hose an annular water-proof cap, *a*, made preferably of vulcanized India rubber or a vulcanizable compound, of such size and shape as to fit snugly over the end of the hose, and protect the plies of canvas which would otherwise be exposed to the action of the fluid or moisture. The sides of the cap extend a sufficient distance back upon both the interior and exterior of the hose to fully protect the end, and the union of the cap with the hose is effected in any suitable manner, when the coupling is applied; for instance, by means of wire wrapped tightly over the sides of the cap and around the hose, as shown in the drawing.

By this means, I find that the end of the hose around the coupling can be amply and effectually protected, all moisture being kept from the canvas plies.

The cap may be made of any size or shape, and of any material suited for the purpose, though I much prefer the construction shown in the drawing.

Having now described my invention, and the manner in which the same is or may be carried into effect,

What I claim, and desire to secure by Letter Patent, is—

1. Protecting the ends of vulcanized India-rubber hose, by means of an annular water-proof cap, in the manner substantially as described.

2. As a new article of manufacture, an annular water-proof cap, for protecting the ends of vulcanized India-rubber hose, the same being applied and used substantially as shown and set forth.

In testimony whereof, I have signed my name to this specification, before two subscribing witnesses.

HENRY A. ALDEN.

Witnesses:
A. POLLOK,
M. BAILEY.